US008026936B2

(12) United States Patent
Ting

(10) Patent No.: US 8,026,936 B2
(45) Date of Patent: Sep. 27, 2011

(54) METHOD FOR DISPLAYING IMAGES AND DISPLAY APPARATUS USING THE SAME

(75) Inventor: Hou-Chun Ting, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 935 days.

(21) Appl. No.: 11/697,098

(22) Filed: Apr. 5, 2007

(65) Prior Publication Data

US 2008/0211788 A1 Sep. 4, 2008

(30) Foreign Application Priority Data

Jan. 31, 2007 (TW) ............................... 96103502 A

(51) Int. Cl.
*G09G 5/02* (2006.01)
*G09G 5/00* (2006.01)
*G06K 9/32* (2006.01)

(52) U.S. Cl. ........ 345/698; 345/660; 345/663; 382/298; 382/299; 348/561; 348/581; 348/582; 348/704; 708/208

(58) Field of Classification Search .................. 345/660, 345/670–671, 472–472.2, 698; 348/561, 348/581–582, 704; 382/298, 299; 708/208
See application file for complete search history.

(56) References Cited

U.S. PATENT DOCUMENTS

| | | | | |
|---|---|---|---|---|
| 7,532,216 | B2 * | 5/2009 | Wendel et al. | 345/472 |
| 2004/0091157 | A1 * | 5/2004 | Kang | 382/233 |
| 2004/0126021 | A1 * | 7/2004 | Sull et al. | 382/233 |
| 2005/0024391 | A1 * | 2/2005 | Damera-Venkata et al. | 345/698 |
| 2006/0033761 | A1 * | 2/2006 | Suen et al. | 345/660 |

* cited by examiner

*Primary Examiner* — Bipin Shalwala
*Assistant Examiner* — Ilana Spar
(74) *Attorney, Agent, or Firm* — J.C. Patents

(57) ABSTRACT

A method for displaying images in a display apparatus is provided herein. In the display apparatus, an image is displayed during each frame period of a plurality of contiguous frames. At first, original images are received, and each of the received original images is composed of M number of contiguous image rows. A predetermined amount of frame periods are grouped as a frame group. During each frame period, one of M number of image rows is selected as an initial image row. From the initial image row, N number of image rows are selected from the M number of image rows according to an image row selection rule to constitute an image for displaying. In each frame group, at least two different initial parameters are used within two frame periods in order to output different images.

15 Claims, 12 Drawing Sheets

METHOD FOR DISPLAYING IMAGES AND DISPLAY APPARATUS USING THE SAME

CROSS-REFERENCE TO RELATED APPLICATION

This application claims the priority benefit of Taiwan application serial no. 96103502, filed Jan. 31, 2007. All disclosure of the Taiwan application is incorporated herein by reference.

BACKGROUND OF THE INVENTION

1. Field of Invention

The present invention relates to a display apparatus. More particularly, the present invention relates to an image display method for adjusting image size.

2. Description of Related Art

At present, most of the portable consumer devices are at least equipped with a LCD (Liquid Crystal Display). When user views contiguous images, since human vision system can adapt to and adjust itself to the quickly updated frames, therefore displays usually operate at a frame rate of more than 25 frames/second. If the frame rate is lower than 25 frames/second, user will see flickering images when viewing contiguous images.

In the current digital display systems, the frame rate is usually higher than 50 frames/second. In fact, a rate of 25 frames/second is enough for users to view contiguous images. Therefore this nature characteristic of human eyes can be used to develop an image size adjusting device which provides preferred viewing quality without using the line buffers. The Line buffer is used to maintain a series of image rows to perform high level real time vertical image adjustment. However, since some SRAMs (Static Random Access Memory) are required to maintain each row of pixels in LCD arrays, therefore the line buffer usually takes the cost of occupying a portion of silicon area. In order to save the memory space used by the line buffers, a known simple line-duplicate or line-drop technology is used to adjust (enlarge or reduce) image vertical size. However, such known technology may result in low image quality.

FIG. 1 schematically illustrates a known digital camera capturing system. Under image capture mode, the reflection light from a subject travels through a lens module 10, and the image sensor 11 converts the reflection into electronic image signals to depict the image of the subject. An image signal processor 12 receives and saves the electronic image signals into DRAM (Dynamic Random Access Memory) 13. In addition, the image signal processor 12 can also process the electronic image signals depending on the system requirement, and the processed electronic image signals are saved in memory 14. Before the digital camera captures image, a display panel 15 is used to preview the image of the subject. After digital camera captured and saved the electronic image signals in DRAM 13, digital camera can switch from capture mode to play mode to view the captured image of the subject. Under the play mode, the electronic image signals stored in DRAM 13 can be read out by an image signal processor 12 which enlarges or reduces the image size to fit in the size of display panel 15.

More specifically, since the size of original image depicted by the electronic image signals is not necessary the same size with the display panel 15, therefore the electronic image signals need to be processed to adjust the size of the original image. If the size of the original image is larger than the size of the display panel 15, then the size of the original image need to be reduced. When the image signal processor 12 adjusts the image vertical size bases on the known simple line-duplicate or line drop technology, an image distortion may occur.

For example, with reference to FIG. 2*a* and FIG. 2*b*, the original image 20 in FIG. 2*a* is reduced by half to form the image 21 in FIG. 2*b*. It can be seen from FIG. 2*a* and FIG. 2*b*, a portion of the image rows of the original image 20 are ignored and the characteristic of which doesn't show on image 21, especially for the characteristic of the upper half. Similarly, in FIG. 3*a* and FIG. 3*b*, the original image 30 of FIG. 3*a* is reduced by half to form the image 31 in FIG. 3*b*. It can be seen from FIG. 3*a* and FIG. 3*b*, a portion of image rows of the original image 30 was omitted. As a result, comparing with the original image 30, image 31 was totally distorted. Next with reference to FIG. 4*a* and FIG. 4*b*, the original image 40 is enlarged by one and half times (3/2 times) to form the image 41 in FIG. 4*b*. It can be seen from FIG. 4*a* and FIG. 4*b*, a portion of image rows of original image 40 was duplicated and a serrated edge was resulted.

Therefore the present invention provides an image display method which provides a resized image with preferred viewing quality through controlling image rows selection without using line buffer.

SUMMARY OF THE INVENTION

The present invention provides an image display method suitable for use on a display apparatus having a plurality of contiguous frame periods. And the display apparatus displays an output image during each frame period. The image display method comprises: receiving an original image, wherein the original image has M number of contiguous image rows; grouping a predetermined number of frame periods into an image group; selecting one of M number of image rows in each image frame period as an initial image row, wherein in each of image frame group, a different initial parameter is added to at least two image frames to correspond to different image contents; and in each image group, starting from the initial image row, selecting N number of image rows from M number of image rows according to an image selecting rule to form the output images.

The present invention further provides an image display method for use on a display apparatus. The display apparatus has a plurality of contiguous frame periods. And the display apparatus outputs an image during each frame period. The display method includes: receiving an original image comprising M number of contiguous image rows; determining whether the display panel is in the $2q^{th}$ or the $(2q+1)^{th}$ frame period, wherein $0 \leqq q$; selecting one of M number of image rows as a first initial image row when the display panel is during the $2q^{th}$ frame period, and starting from the first initial image row, selecting N number of image rows from M number of image rows according to an image row selecting rule to form the output image; and adding different initial parameters when the display panel is in the $(2q+1)^{th}$ frame period; and selecting one of M number of image rows as a second initial image row, and starting from the second initial image row, selecting N number of image rows from M number of image rows according to the image row selecting rule to form the output image.

The present invention provides a display apparatus including a receiving device, a display panel and a processing device. The receiving device receives an original image comprising M number of image rows. The display panel has a plurality of contiguous frame periods. And during each frame period, the display panel displays an output image according to the original image. The processing device is connected to the receiving device to group a predetermined number of frame periods into a frame group. During each frame period, the processing device selects one of M number of image rows as an initial image row. And starting from this initial image row, N number of image rows are selected from M number of image rows according to an image row selecting rule to form the output image. Wherein in every frame group, different initial parameter is added to at least two frame periods to correspond to different image contents.

In order to the make the aforementioned and other objects, features and advantages of the present invention comprehensible, a preferred embodiment accompanied with figures is described in detail below.

DESCRIPTION OF EMBODIMENTS

Figure 5:
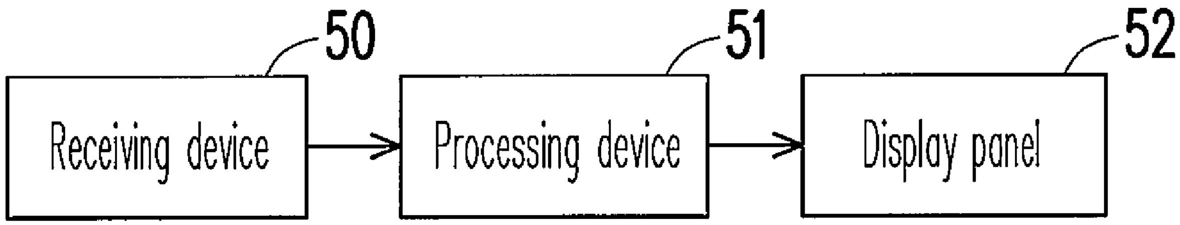
FIG. 5 schematically illustrates a display apparatus according to an embodiment of the present invention.

FIG. 5 schematically illustrates a display apparatus according to an embodiment of the present invention. With reference to FIG. 5, the display apparatus 5 has a receiving device 50, a processing device 51 and a display panel 52. The receiving device 50 receives the original image imported from outside or captured by self of the receiving device 50. In the present embodiment, suppose that the original image includes M number of contiguous image rows. The processing device 51 is coupled to the receiving device 50. The display panel 52 has a plurality of contiguous frame periods to display contiguous images. And the display panel 52 displays an output image during each frame period according to the original image. In the present embodiment, suppose that the output image is composed of N number of image rows. The processing device 51 groups a predetermined number of frame periods into a frame group. And during each frame period, one of M number of image rows is selected as an initial image row, and starting from the initial image row, N numbers of image rows are selected from M number of image rows according to the predetermined image row selecting rule to form an output image. When the original image size has to be reduced, i.e. when N<M, the processing device 51 ignores a portion of M number of image rows. When the original image size has to be enlarged, i.e. when N>M, the processing device 51 repeatedly selecting a portion of M number of image rows.

Here please note, in each frame group, different initial parameters are added to at least two frame periods so as to correspond to different image contents. In other words, in each frame group, the output images from at least two frame periods are different. Therefore, when reducing (M>N) or when enlarging (M<N) the size of original image, a plurality of output images are switched during a plurality of contiguous frame periods, with the help of persistence of vision in human vision system, viewer sees a plurality of overlapped output images, therefore user sees less image distortion.

In the following descriptions, for example the processing device 51 groups every two contiguous frame periods into a frame group. The original image is represented with L(m), wherein $0 \leqq m \leqq M-1$, for example L(0) represents the first image row of the original image. The output image is represented with L'(n,t), $0 \leqq n \leqq N-1$, and t is a time parameter. The relation between M and N is described by the below formula:

$$N=\text{int}[(M-1)*s]+1$$

Wherein int[ ] means integers are retained, s is a adjustment parameter. When the adjustment parameter s>1, means to enlarge the size of the original image; on the contrary, if s<1, means to reduce the size of the original image. Therefore it is known that the original image has M number of image rows, and after the original image is enlarged or reduced, the output image will then have N number of image rows. The inverse (1/s) of the adjustment parameter s is the selection interval.

The relation (i.e. image row selection rule) between the original image L(m) and output image L'(n,t) is described below:

$$L'(n,t)=L(\text{int}[n/s+\alpha(t)+\rho]) \quad \text{Formula 1}$$

Wherein α(t) represents the initial image row selected according to the frame period, ρ represents a row selecting parameter. In the present embodiment, when ρ=0.5, it means rounding rule is applied; when ρ=0, means unconditional discard rule is applied.

Since the output images are displayed and updated under separated time-domain (for example t=0, T, 2T . . . ), therefore formula 1 is revised as:

$$L'(n,kT)=L(\text{int}[n/s+\alpha(k)+\rho]) \quad \text{Formula 2}$$

Wherein T represents a frame period, and k is an integer. α(k) is divided into α(2q) and α(2q+1) which respectively represents the initial image row selected by the $2q^{th}$ frame period and the initial image row selected by the $(2q+1)^{th}$ frame period, wherein $0 \leqq q$.

Figure 1:
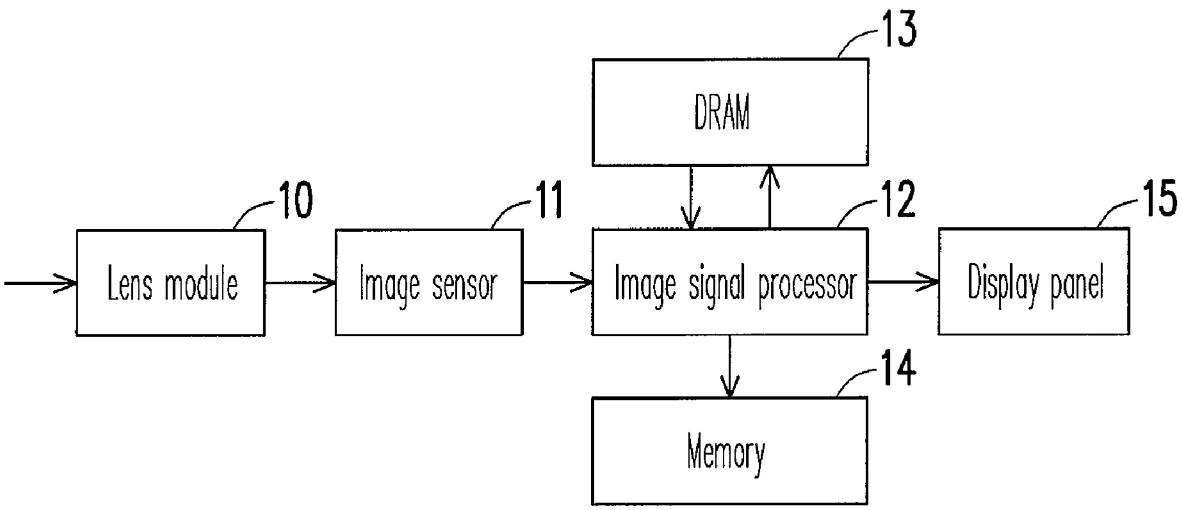
FIG. 1 schematically illustrates the known digital camera photography system.
Figures 2A, 2B:
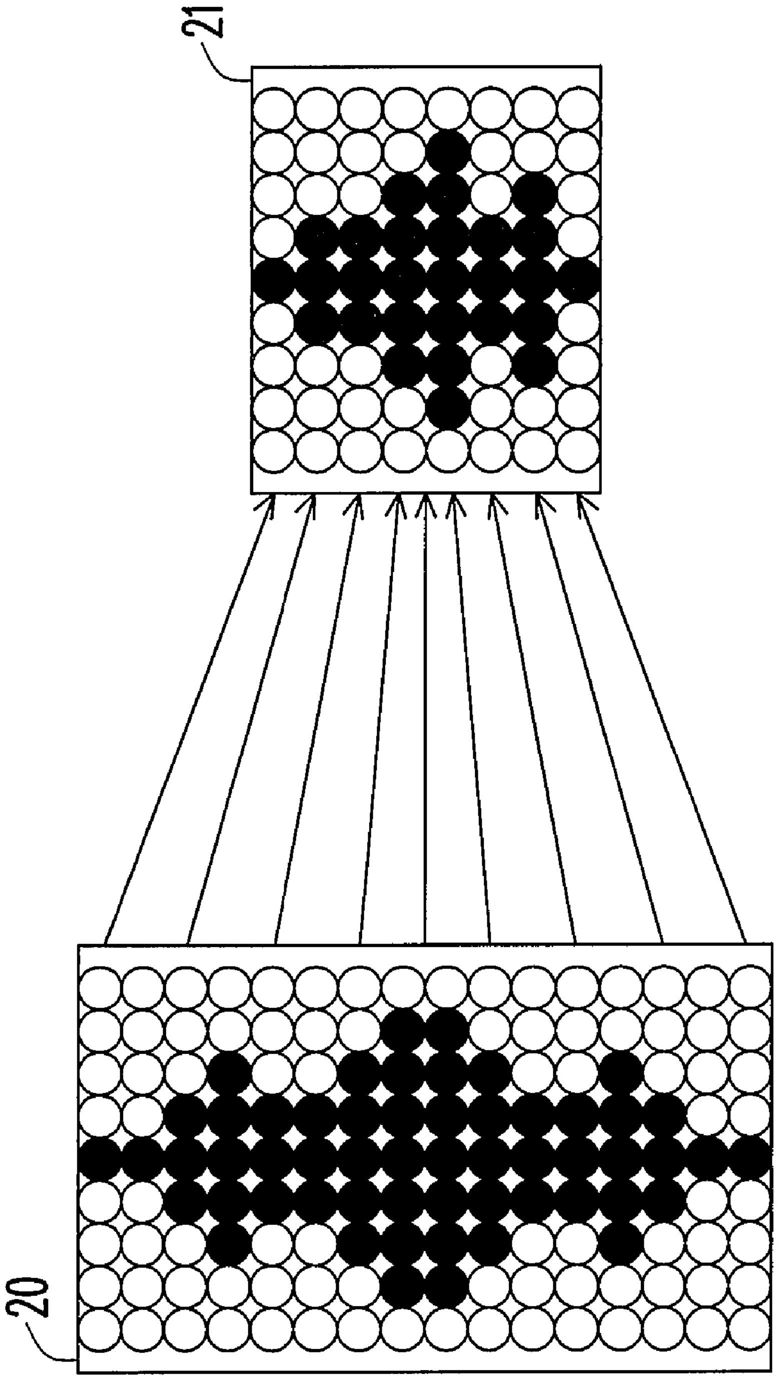
FIG. 2b (PRIOR ART)
FIG. 2a (PRIOR ART)
FIG. 2*a* and FIG. 2*b* schematically illustrate an example of image distortion phenomenon when reducing the size of the original image.
Figures 6A, 6B, 6C:
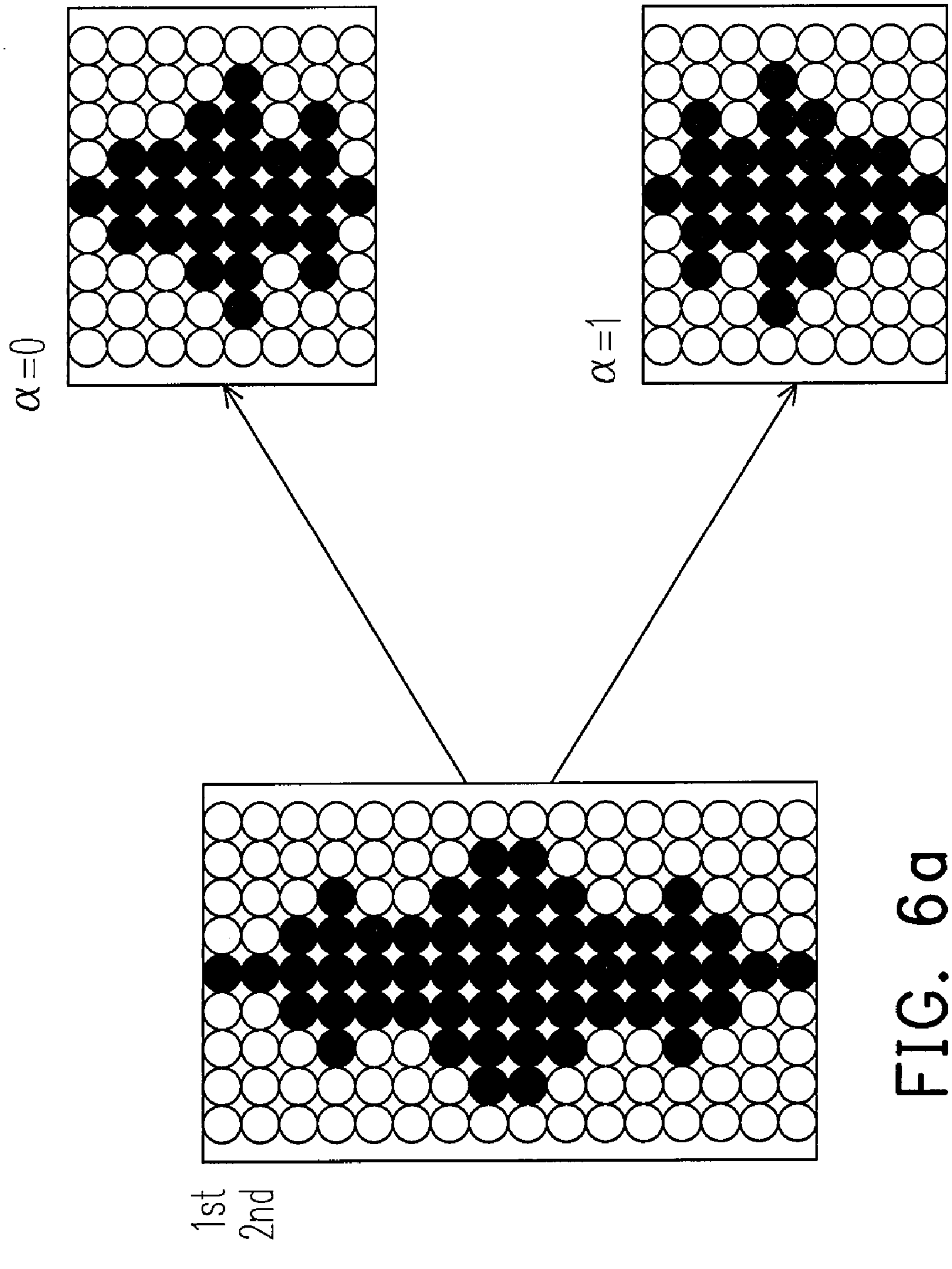
FIG. 6*a* to FIG. 6*d* schematically illustrates an example of reducing the size of an original image according to an embodiment of the present invention.
Figure 6D:
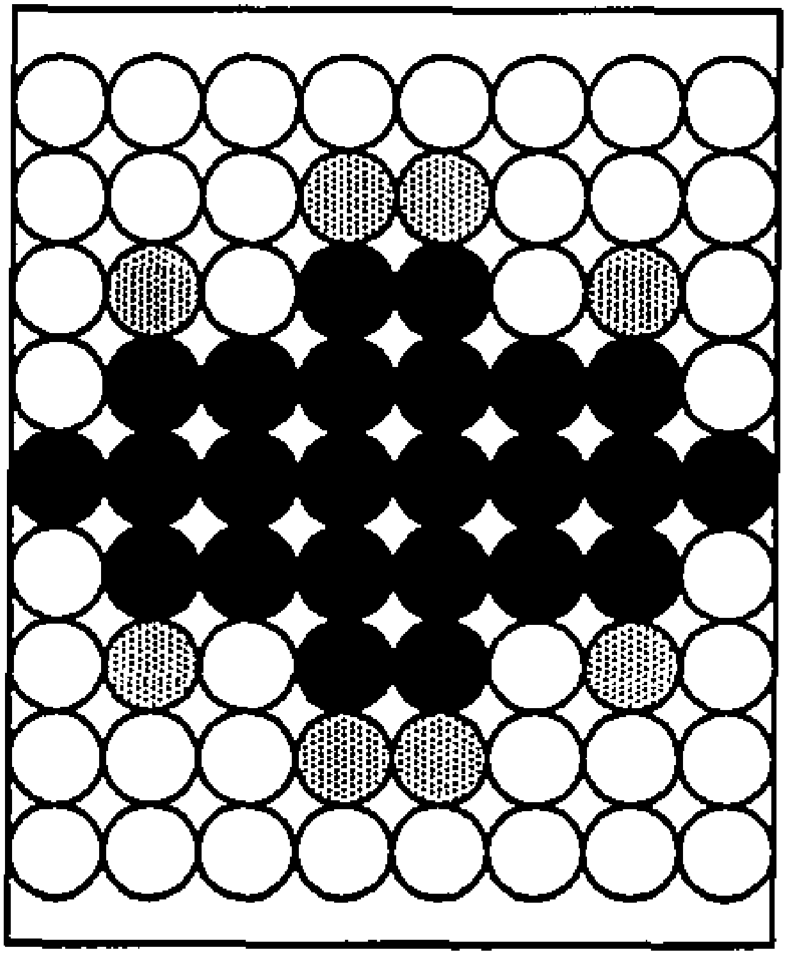

With reference to FIG. 6*a* to FIG. 6*c*, suppose that M=16, N=8, s=½, α(2q)=0, α(2q+1)=1, and ρ=0.5. Wherein α(2q)=0 represents that during the $2q^{th}$ frame period the first image row ($1^{st}$) of the original image is selected as the initial image row. And α(2q+1)=1 represents that during the $(2q+1)^{th}$ frame period the second image row ($2^{nd}$) of the original image is selected as the initial image row. In other word, the output image of the $2q^{th}$ frame period and the output image of the $(2q+1)^{th}$ frame period have different parameter α, i.e. the $2q^{th}$ frame period and the $(2q+1)^{th}$ frame period correspond to different initial frame rows. Since adjustment parameter s=½, means the original image will be reduced by ½. In other word, starting from the initial image row, in every two rows (1/s=2), the image row of the original image is selected once as the image row of the output image. FIG. 6*b* schematically illustrates the output image displayed during the $2q^{th}$ frame period. FIG. 6*c* schematically illustrates the output image displayed during the $(2q+1)^{th}$ frame period. With a switched parameter α, and together with the persistence of vision of human vision system, the output images of the $2q^{th}$ and the $(2q+1)^{th}$ frame periods are mixed, user will see the image shown in FIG. 6*d*. Comparing with the image in FIG. 2*b*, the image shown in FIG. 6*d* can better describe the characteristic of the original image, so the image distortion is reduced.

Figures 3A, 3B:
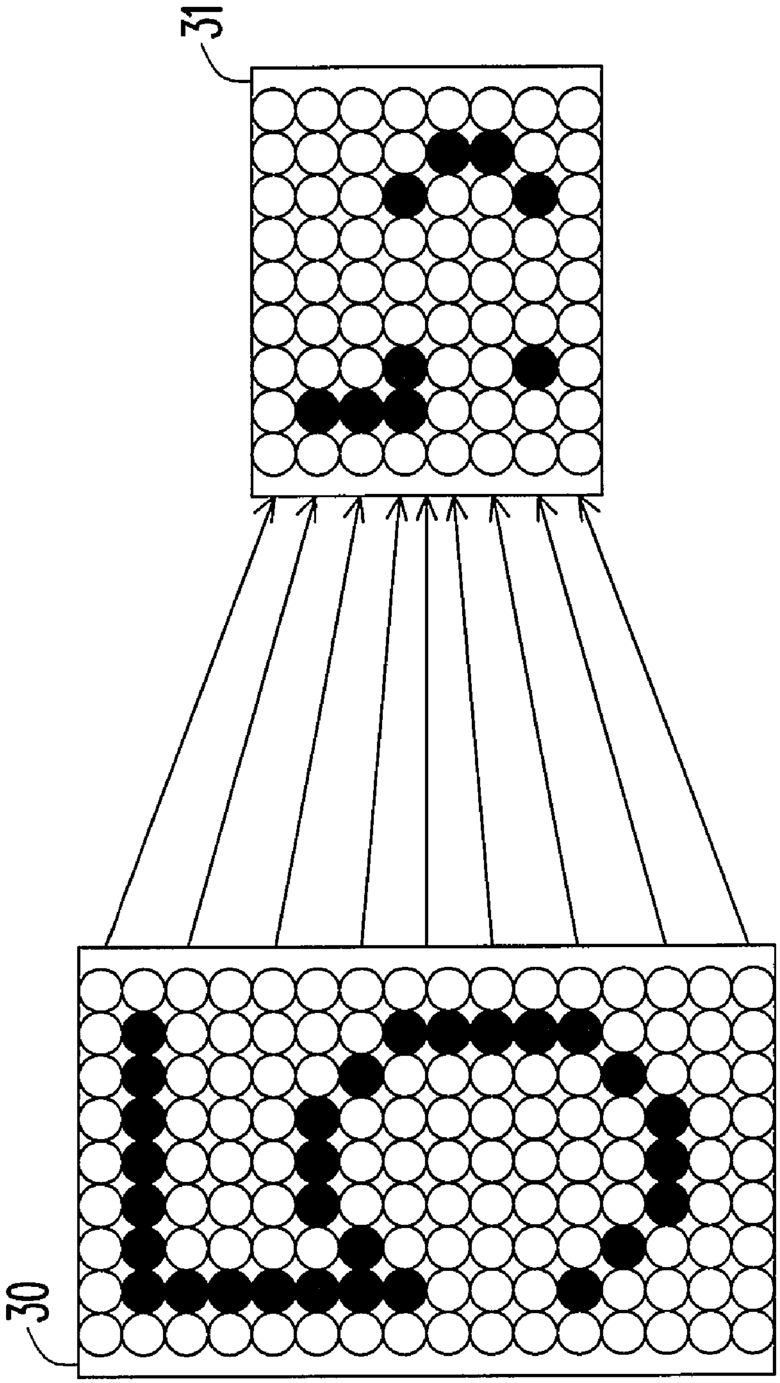
FIG. 3a (PRIOR ART)
FIG. 3b (PRIOR ART)
FIG. 3*a* and FIG. 3*b* schematically illustrate an example of image distortion phenomenon when reducing the size of the original image.
Figures 7A, 7B, 7C:
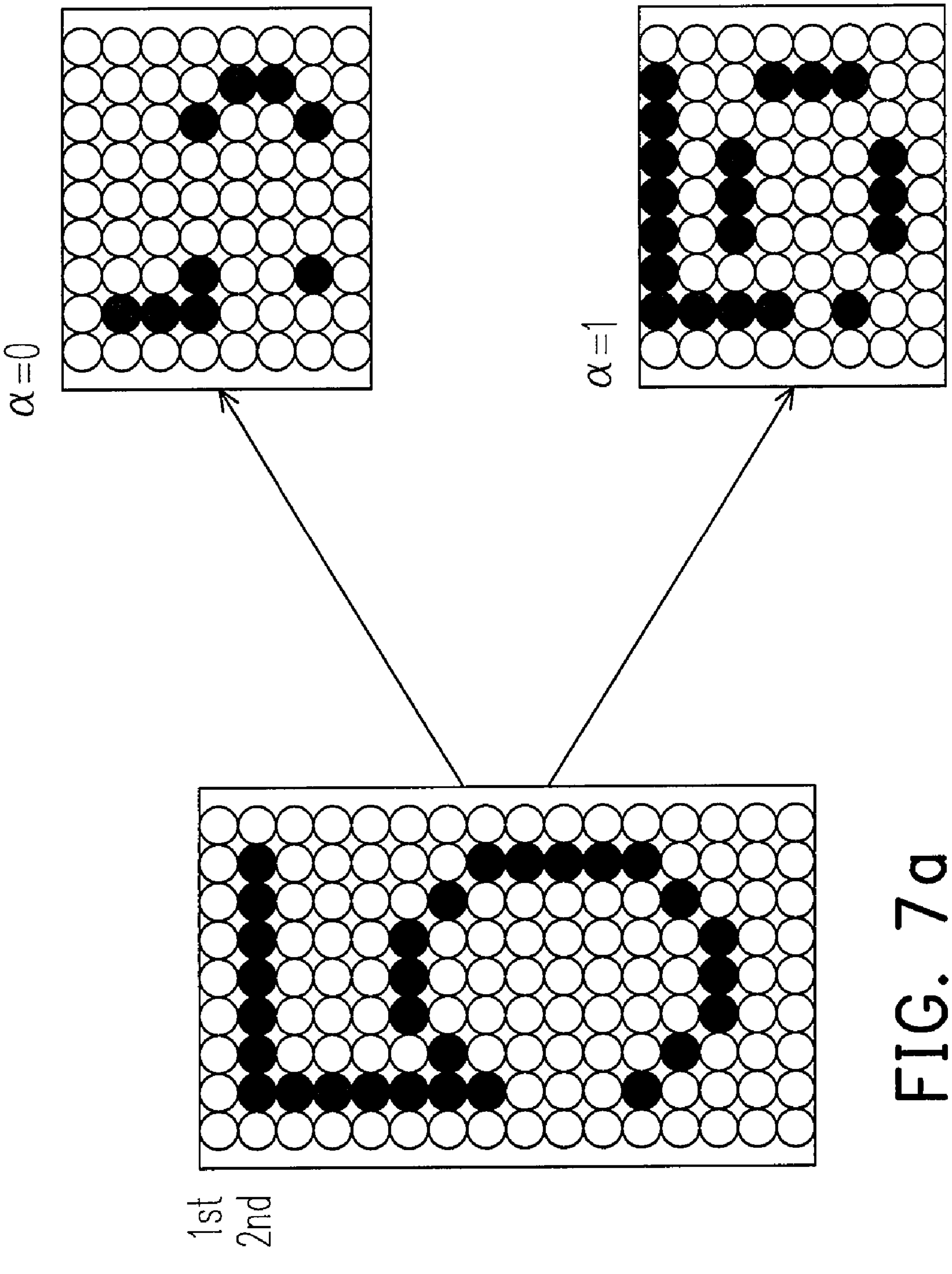
FIG. 7*a* to FIG. 7*d* schematically illustrates another example of reducing the size of an original image according to an embodiment of the present invention.
Figure 7D:
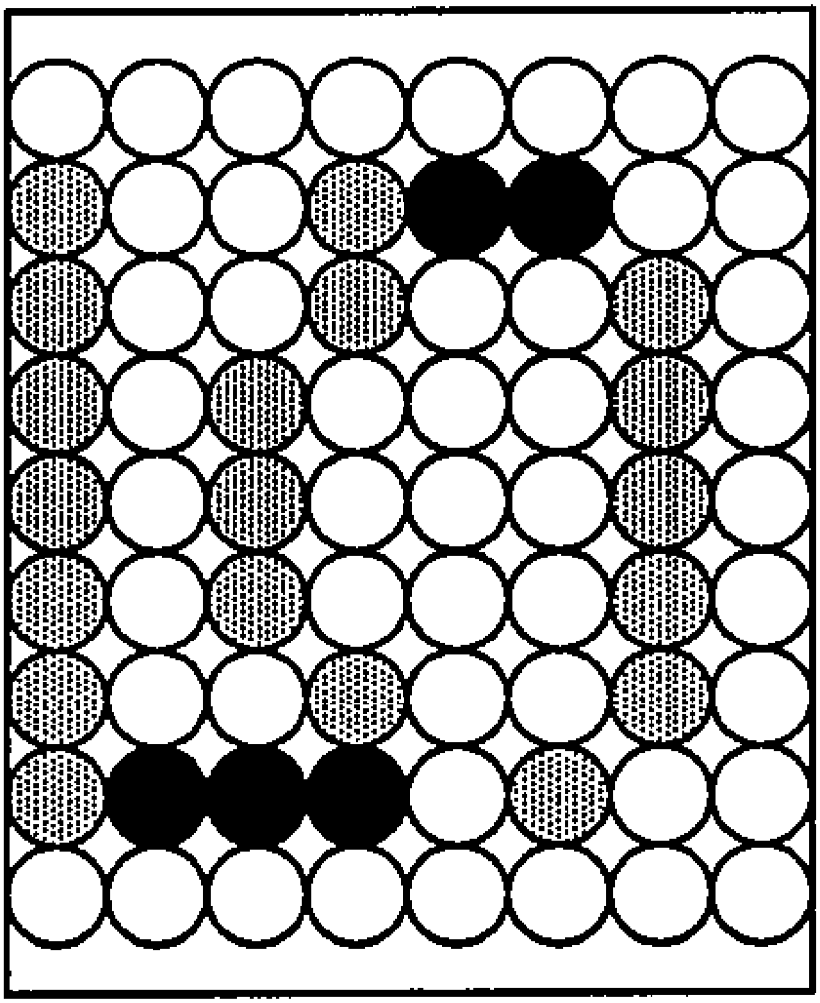

Similarly, with reference to the images in FIG. 7*a* to FIG. 7*c*, suppose that M=16, N=8, s=½, α(2q)=0, α(2q+1)=1, and ρ=0.5. FIG. 7*b* schematically illustrates the output image displayed during the $2q^{th}$ frame period; FIG. 7*c* schematically illustrates the output image displayed during the $(2q+1)^{th}$ frame period. With the switching parameter α, and together with the persistence of vision of human vision system, the output images of the $2q^{th}$ and the $(2q+1)^{th}$ frame periods are mixed, then user will see the image shown in FIG. 7*d*. Comparing with the image in FIG. 3*b*, the image shown in FIG. 7*d* can better describe the complete original image, so the image distortion is reduced.

It is know from the embodiments of FIG. 6*a*-6*d* and FIG. 7*a*-7*d*, when reducing the size of the original image, α(2q+1) is set to 1/(2s).

Figures 4A, 4B:
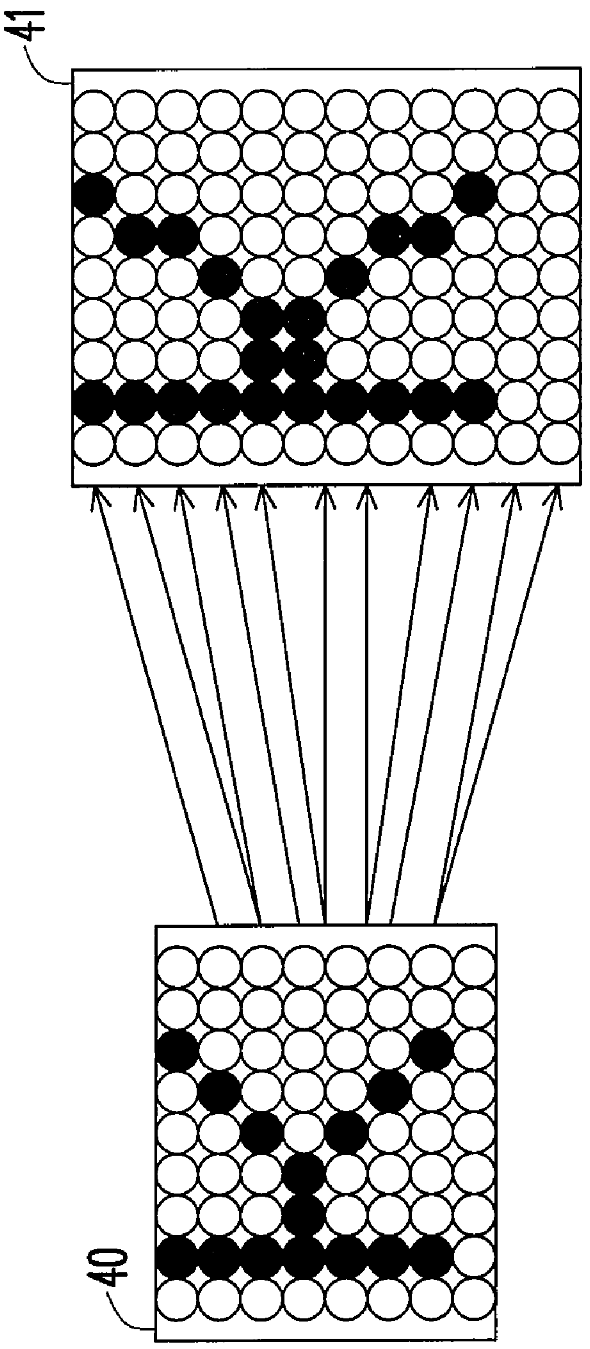
FIG. 4a (PRIOR ART)
FIG. 4b (PRIOR ART)
FIG. 4*a* and FIG. 4*b* schematically illustrate another example of image distortion phenomenon when enlarging the original image.
Figures 8A, 8B, 8C:
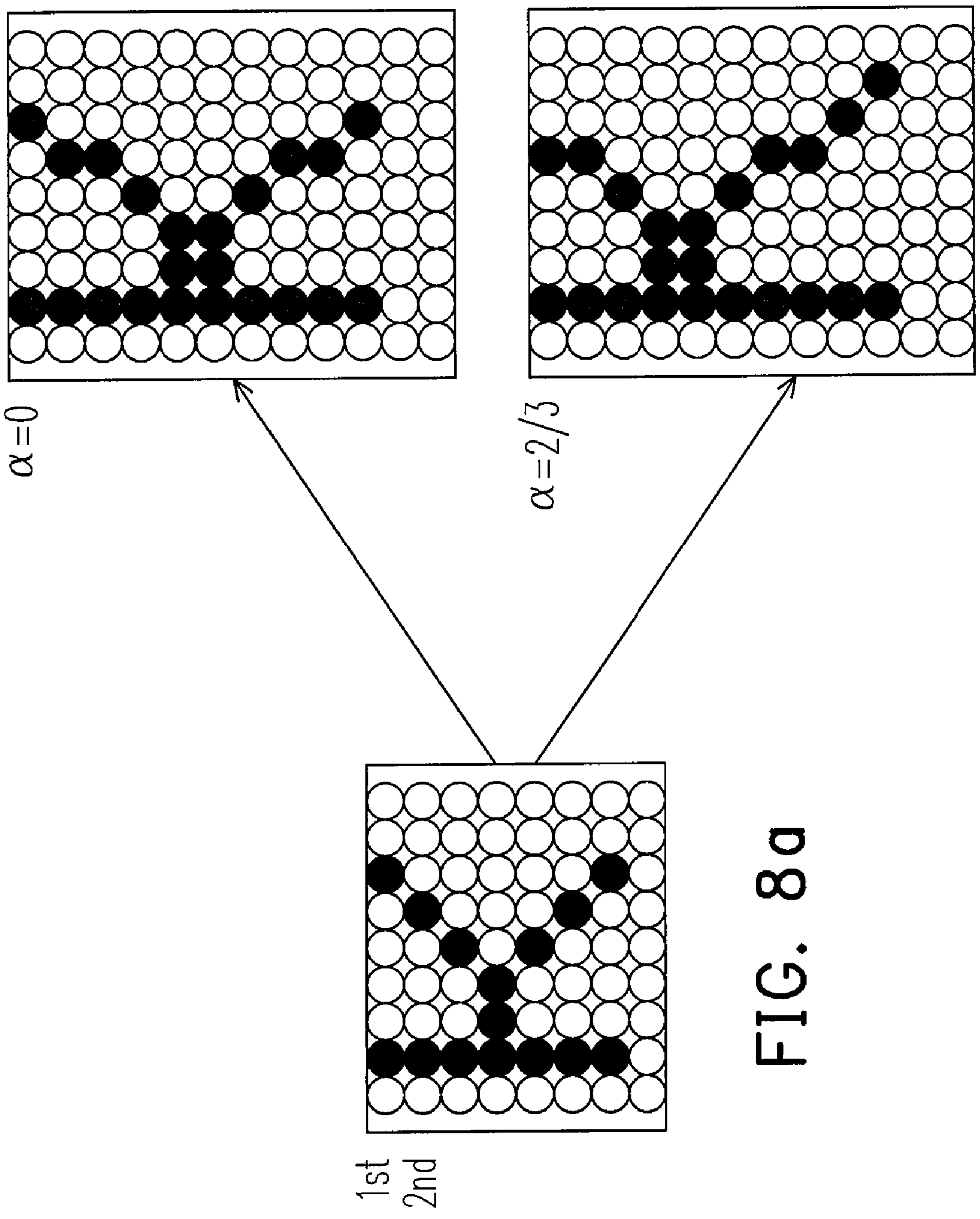
FIG. 8*a* to FIG. 8*d* schematically illustrates an example of enlarging the size of an original image according to an embodiment of the present invention.
Figure 8D:
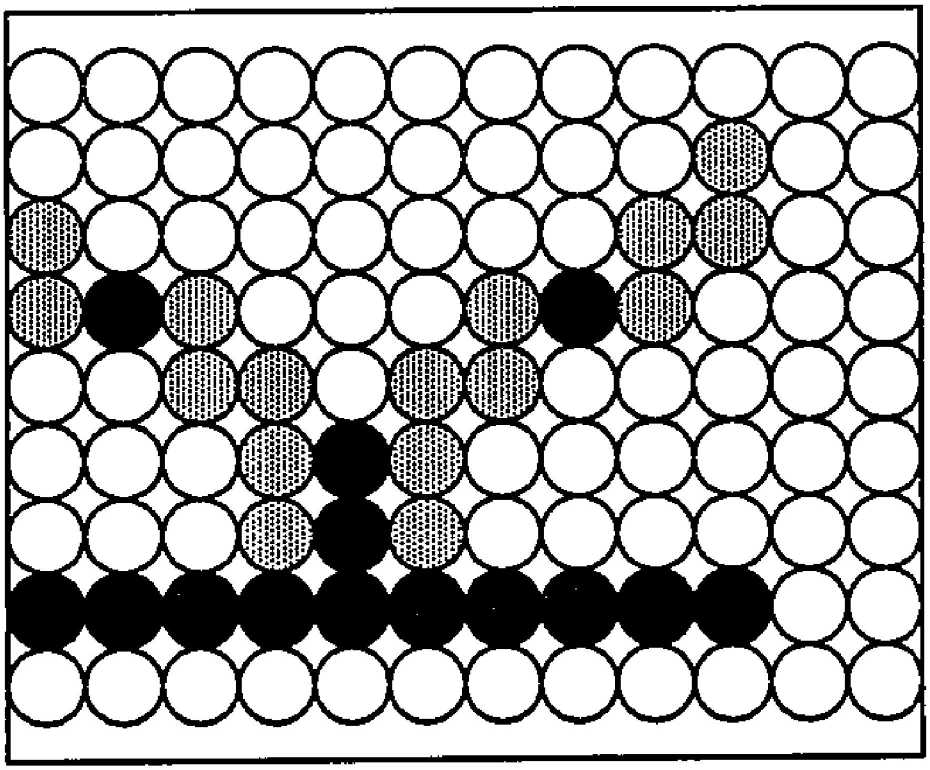

Next with reference to FIG. 8*a* to FIG. 8*c*, suppose that M=8, N=12, s=3/2, α(2q)=0, α(2q+1)=3/2, and ρ=0.5. Wherein α(2q)=0 means that during the $2q^{th}$ frame period the first image row ($1^{st}$) of the original image is selected as the initial image row. And α(2q+1)=3/2 means that the selected result during the $(2q+1)^{th}$ frame period is between the first ($1^{st}$) image row and the second image row ($2^{nd}$) of the original image. Since ρ=0.5 means rounding rule is applied, therefore the second ($2^{nd}$) image row of the original image is selected as the initial image row during the $(2q+1)^{th}$ frame period. Since the adjustment parameter s=3/2, means the original image will be enlarged by 3/2 times. In other word, starting from the initial image row, the image row of the original image is selected once in every 2/3 rows (1/s=2/3) as the image row of the output image. If the selecting result is between the two image rows of the original image, then one of the image rows is selected according to rounding rule. FIG. 8*b* schematically illustrates the output image displayed during the $2q^{th}$ frame period. FIG. 8*c* schematically illustrates the output image displayed during the $(2q+1)^{th}$ frame period. With the switching parameter α, and together with the persistence of vision of human vision system, the output images of the $2q^{th}$ and the $(2q+1)^{th}$ frame periods are mixed, user will see the image shown in FIG. 8*d*. Comparing with the image in FIG. 4*b*, the image shown in FIG. 8*d* is smoother, the image distortion is reduced.

It is known according to the embodiment of FIG. 8*a*-8*d*, to enlarge the original image, α(2q+1) is set to 1/s.

Figure 9:
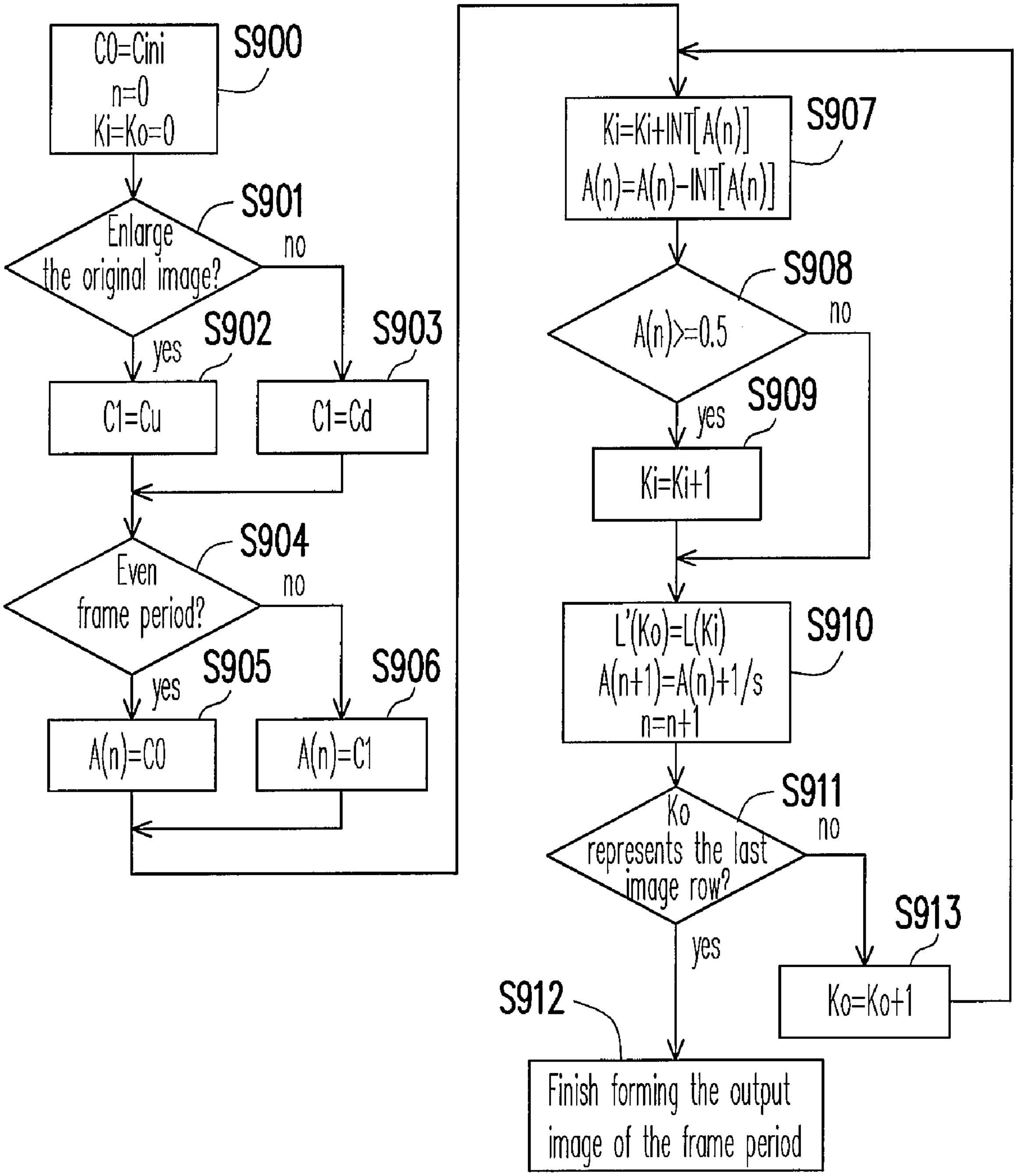
FIG. 9 is a schematic flow chart of an image display method according to an embodiment of the present invention.

FIG. 9 shows a flow chart of an image display method according to an embodiment of the present invention. This flow chart is suitable for a display apparatus. In the embodiment, for example every two contiguous frame periods are grouped into a frame group. α(2q) is represented with C0, α(2q+1) is represented with C1, and an initial parameter Cini is set. An enlargement parameter Cu and a reduction parameter Cd are set, wherein Cu=1/s, and Cd=1/2s. In addition, parameters Ki and Ko are further set, wherein 0≦Ki≦M−1, and 0≦Ko≦N−1. Wherein the parameter Ki tells which image row of the original image is currently selected, and the parameter Ko shows which number of the image row of the output image is. For example, when Ki=0, means the first ($1^{st}$) image row of the original image is currently selected, and so on. When Ko=0, means the first image row of the output image, and so on. In the embodiment of FIG. 9, parameter A(n) is set, 0≦n=≦N−1. The row selection parameter is set to 0.5, means the rounding rule is applied.

First, in step S900, the initial image row selected in the $2q^{th}$ frame period is initialized as the first image row (C0=Cini) of the original image. Parameter n is initialized to 0 (n=0), and parameter Ki and Ko is initialized to 0 (Ki=0, Ko=0). It is determined in step S901 that whether the original image is to be enlarged. If yes, then set the parameter C1 to the enlargement parameter Cu (C1=Cu) (step S902); if not, then set the parameter C1 to the size reduction parameter Cd (C1=Cd) (step S903). Next, determine if the display apparatus is during even number frame period (step S904). If yes, then set the parameter A(n) to C0 (A(n)=C0) (Step S905); if not, then set parameter A(n) to C1(A(n)=C1) (step S906). Step S907 calculates currently which number image row (Ki=Ki+INT[A(n)]) of the original image should be selected, and calculates the fraction portion (A(n)=A(n)−INT[A(n)])) of parameter A(n), to determine if the fraction portion of A(n) is greater or equal to 0.5 (A(n)>=0.5) (step S908). If the fraction portion of A(n) is greater or equal to 0.5, then the next row (Ki=Ki+1) of the image row acquired through calculation in step S907 is selected (step S909). If the fraction portion of the parameter A(n) is less than 0.5, then go to step S910.

After determining to select the image row of the original image, the selected image row of the original image are converted to form the image row (L'(Ko)=L(Ki)) of the output image, (step S910). In step S910, the parameter A(n) (A(n+1)=A(n)+1/s, n=n+1) of the next image row of the output image is set. Next determine if the image row (Ko) of the formed output image is the last row (step S911). If yes, then finish forming the output image of the frame period (step S912); if not, then proceed to form the image row of the next output image (Ko=Ko+1) (step S913). Then repeat step S907-S913.

According to the embodiment of FIG. 9, different output images are produced during the $2q^{th}$ and the $(2q+1)^{th}$ frame periods. The output images formed during the $2q^{th}$ and the $(2q+1)^{th}$ frame periods are mixed according to persistence vision of human vision system, user will see the mix of different images, therefore the enlarged or reduced image is more smooth, the distortion is reduced. In addition, according to the embodiment of the present invention, since the line buffer is not necessary to use when enlarge or reduce the image size, therefore the size and the cost of the display apparatus are reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

Description of the Main Components

10~lens module; 11~image sensor; 12~image signal processor; 13~DRAM; 14~memory; 15~display panel;

5~display apparatus; 50~receiving device; 51~processing device; 52~display panel;

What is claimed is:

1. An image display method suitable for use in a display apparatus having a plurality of contiguous frame periods, and the display apparatus displaying an output image during each frame period, the image display method comprising:

receiving an original image, wherein the original image comprises M number of contiguous image rows;

grouping a predetermined number of the frame periods into a frame group;

during each of the frame periods, selecting one of the M number of image rows as an initial image row, wherein in each of the frame groups at least two frame periods have a different initial parameter to correspond to different image contents, and the different initial parameter initializes the initial image row selected in the at least two frame periods as different rows of the original image; and during each of the frame periods, starting from the initial image row, selecting N number of image rows from the M number image rows according to an image selecting rule to form the output image, wherein each of the N number of image rows and each of the M number of image rows have a same number of image columns, and each pixel of the selected M number image rows is selected, wherein the image row selecting rule comprises a row selecting parameter, and the procedures of selecting the N number of image rows from the M number of image rows comprises:

performing complex number adding calculation starting from the initial row using the row selecting parameter.

2. The image display method according to claim 1, wherein in the step of selecting the N number of image rows from the M number of image rows, when N<M, then a portion of the M number of image rows is ignored according to the image row selecting rule.

3. The image display method according to claim 1, wherein in the step of selecting the N number of image rows from the M number of image rows, when N>M, then a portion of the M number of image rows is repeatedly selected according to the image row selecting rule.

4. The image display method according to claim 1, wherein the procedures of selecting the N number of image rows from the M number of image rows comprises:

when any one of the results from the adding calculation falls between the two contiguous image rows of the original image, with the rounding rule, the previous one or the latter one of the two contiguous image rows is selected as the image row of the output image.

5. The image display method according to claim 1, wherein the procedures of selecting the N number of image rows from the M number of image rows comprises:

when any one of the results from the adding calculation falls between the two contiguous image rows of the original image, the previous one of the two contiguous image rows is selected as the image row of the output image.

6. An image display method, suitable for use in a display apparatus comprising a display panel having a plurality of contiguous frame periods, and displaying an output image during each frame period, wherein the image display method comprising:

receiving an original image, wherein the original image comprising M number of contiguous image rows;

determining the display panel being in the $2q^{th}$ or the $(2q+1)^{th}$ frame period, wherein q is larger than or equal to 0;

when the display panel being in the $2q^{th}$ frame period, adding a first initial parameter, selecting N number of image rows from the M number of image rows according to an image row selecting rule to form the output image, wherein the first initial parameter initializes an initial image row selected in the $2q^{th}$ frame period as one of the M number of contiguous image rows of the original image; and when the display panel being in the $(2q+1)^{th}$ frame period, adding a second initial parameter, selecting N number of image rows from the M number of image rows according to the image row selecting rule to form the output image, wherein the second initial parameter initializes the initial image row selected in the $(2q+1)^{th}$ frame period as another one of the M number of contiguous image rows of the original image, wherein the first initial parameter is different from the second initial parameter, each of the N number of image rows and each of the M number of image rows have a same number of image columns, and each pixel of the selected M number image rows is selected, wherein the image row selecting rule comprises a row selecting parameter, and the procedure of selecting the N number of image rows from the M number of image rows comprises:

performing complex number adding calculation starting from an initial row using the row selecting parameter.

7. The image display method according to claim 6, wherein in the step of selecting the N number of image rows from the M number of image rows, when N<M, then a portion of the M number of image rows is ignored according to the image row selecting rule.

8. The image display method according to claim 6, wherein in the step of selecting the N number of image rows from the M number of image rows, when N>M, then a portion of the M number of image rows is repeatedly selected according to the image row selecting rule.

9. The image display method according to claim 6, wherein the procedure of selecting the N number of image rows from the M number of image rows comprises:

when any one of the results from the adding calculation falls between the two contiguous image rows of the original image, with the rounding rule, the previous one or the latter one of the two contiguous image rows is selected as the image row of the output image.

10. The image display method according to claim 6, wherein the procedure of selecting the N number of image rows from the M number of image rows comprises:

when any one of the results from the adding calculation falls between the two contiguous image rows of the original image, the previous one of the two contiguous image rows is selected as the image row of the output image.

11. A display apparatus, comprising:

a receiving device, receiving an original image, wherein the original image comprises M number of contiguous image rows;

a display panel, having a plurality of contiguous frame periods, and the display panel displaying an output image during each of the frame periods according to the original image; and a processing device, coupled to the receiving device to group a predetermined number of the frame periods into a frame group, and in each of the frame periods, selecting one of the M number of image rows as an initial image row, and starting from the initial image row, selecting N number of image rows from the M number of image rows according to an image selecting rule to form the output image;

wherein in each of the frame group, at least two frame periods have a different initial parameter to correspond to different image contents, and the different initial parameter initializes the initial image row selected in the at least two frame periods as different rows of the original image;

wherein each of the N number of image rows and each of the M number of image rows have a same number of image columns, and each pixel of the selected M number image rows is selected; and wherein in the image row selecting rule comprises a row selecting parameter, and starting from the initial row the processing device uses the row selecting parameter to perform complex number adding calculation.

12. The display apparatus according to claim 11, wherein when N<M, then a portion of the M number of image rows is ignored by the processing device according to the image row selecting rule.

13. The display apparatus according to claim 11, wherein when N>M, then a portion of the M number of image rows is repeatedly selected by the processing device according to the image row selecting rule.

14. The display apparatus according to claim 11, wherein when any one of the results from the adding calculation falls between the two contiguous image rows of the original image, with the rounding rule, the processing device selects the previous one or the latter one of the two contiguous image rows as the image row of the output image.

15. The image display apparatus according to claim 11, wherein when any one of the results from the adding calculation falls between the two contiguous image rows of the original image, the processing device selects the previous one of the two contiguous image rows as the image row of the output image.

* * * * *